United States Patent [19]

Misinchuk

[11] 4,077,487
[45] Mar. 7, 1978

[54] VEHICLE AUXILIARY BRAKING SYSTEM

[75] Inventor: Peter D. Misinchuk, Toronto, Canada

[73] Assignee: The Raymond Lee Organization, Inc., New York, N.Y.

[21] Appl. No.: 676,116

[22] Filed: Apr. 12, 1976

[51] Int. Cl.² .............................................. B60T 7/02
[52] U.S. Cl. ................................. 180/82 R; 303/15
[58] Field of Search ..................... 180/78, 77 H, 77 R, 180/82 R, 99; 74/481, 482; 310/12, 13, 14; 280/88; 303/15, 3

[56] References Cited

U.S. PATENT DOCUMENTS

| 1,870,525 | 8/1932 | Nagamatsu | 280/88 X |
|---|---|---|---|
| 2,054,806 | 9/1936 | Bush | 310/14 X |
| 2,228,393 | 1/1941 | Leaming | 180/77 H |
| 2,296,003 | 9/1942 | Van Loo | 180/99 |
| 2,354,687 | 8/1944 | Keith | 180/78 X |
| 2,566,859 | 9/1951 | Seeler | 74/482 X |
| 2,899,835 | 8/1959 | Moreland | 74/481 |
| 3,364,818 | 1/1968 | Hager | 74/481 X |

Primary Examiner—Robert R. Song
Attorney, Agent, or Firm—Howard I. Podell

[57] ABSTRACT

An auxiliary braking system for use in a vehicle when operating under heavy stop-go traffic conditions. A linear motor control switch is mounted on a spoke of the steering wheel of the vehicle and is electrically connected to a linear motor which is linked to the control rod of the vehicle braking system. The control rod is also mechanically linked to the conventional brake pedal and may be joined to a vacuum chamber or other power coupling that operates the hydraulic brake piston of the vehicle. The linear motor is linked to the control rod so as to push the control rod towards the position of increased braking, permitting the conventional foot brake pedal to readily override the linear motor for purposes of increased braking.

1 Claim, 3 Drawing Figures

VEHICLE AUXILIARY BRAKING SYSTEM

SUMMARY OF THE INVENTION

My invention is an auxiliary braking system for use in a vehicle when operating under heavy stop-go traffic conditions. A linear motor control switch is mounted on a spoke of the steering wheel of the vehicle and is electrically connected to a linear motor which is linked to the control rod of the vehicle braking system. The control rod is also mechanically linked to the conventional brake pedal and may be joined to a vacuum chamber or other power coupling that operates the hydraulic brake piston of the vehicle. The linear motor is linked to the control rod so as to push the control rod towards the position of increased braking, permitting the conventional foot brake pedal to readily override the linear motor for purposes of increased braking.

By means of my invention, the driver of a vehicle may apply and free the brakes of his vehicle with a finger of his hand, leaving his foot proximate to the accelerator pedal.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
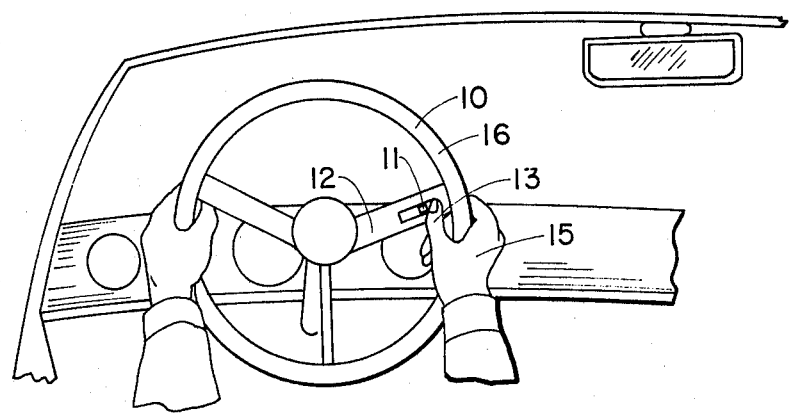
FIG. 1 is an elevation view of the steering wheel of an equipped vehicle.
Figure 2:
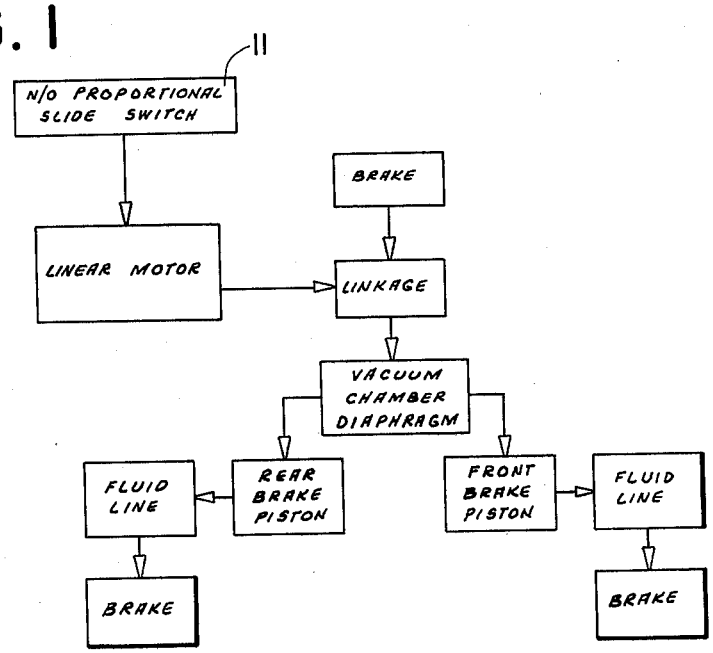
FIG. 2 is a schematic drawing of the circuitry of the invention.
Figure 3:
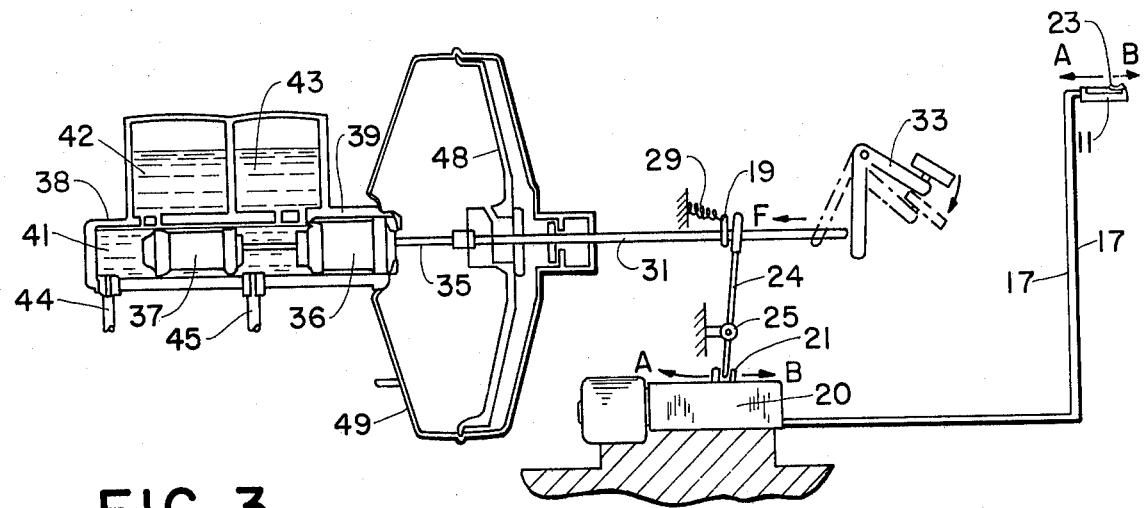
FIG. 3 is a schematic view of the mechanical linkage of the invention.

Turning now descriptively to the drawings, in which similar reference characters denote similar elements throughout the several views, FIG. 1 illustrates the steering wheel 10 of a vehicle with a proportional slide switch 11 mounted in a spoke 12 of the steering wheel 10 at a location readily accessible to the thumb 13 of a driver's hand 15 grasping the wheel rim 16. As shown in FIGS. 2-3, switch 11 is connected by wires 17 to a linear motor 20, the actuator 21 of which moves in either linear direction A or B in response and proportionately to the linear travel of the switch handle 23 in directions A or B respectively.

A lever 24 is pivotally mounted in a fixed bearing 25 to link the motor actuator 21 to the brake control rod 31.

Brake control rod 31 is mechanically linked to the conventional brake foot pedal 33 of the vehicle so that downward pressure of the pedal 33 forces the control rod 31 to travel in the forward direction F, with control rod 31 joined to the piston rod 35 of pistons 36 and 37 of the hydraulic cylinders 38 and 39 respectively that supply the front and rear brake cylinders (not shown) with pressurized fluid 41 from reservoirs 42 and 43 respectively through tubes 44 and 45. Piston rod 35 is joined to a diaphram 48 in a vacuum chamber unit 49 that applies power assistance to the forward travel of brake control rod 31 and piston rod 35.

Pivotal lever 24 is freely mounted about control rod 31, bearing against a bushing 19 fixed to control rod 31 located between lever 24 and the vacuum chamber 49 so that lever 24 may force control rod 31 in the forward direction of travel F, but does not impede the action of the brake pedal 33 in forcing control rod 31 further in the forward direction F when the foot brake pedal is actuated by the driver.

Retraction of the brake control rod 31 in the rearward direction is accomplished by a compression spring 29 mounted against bushing 19 and a fixed member of the vehicle, when there is no counter balancing thrust in rod 31 caused by the brake pedal 33 or the lever 24 rotated by linear motor 20.

By means of my invention, the driver may retain one foot on the accelerator pedal with varying pressure, while he controls the braking effect of the vehicle with his thumb for emergency stop or other purposes while retaining at all times the option of utilizing his brake pedal.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. In a vehicle fitted with a steering mechanism controlled by a steering wheel and a braking mechanism controlled by mechanical linkage joined to a foot brake pedal, a braking control system that provides for alternative control of the braking mechanism by the foot brake pedal or by electrical switching means mounted on the steering wheel of the vehicle, in which said braking control system incorporates a linear motor electrically connected to said electrical switching means and mechanically linked to the mechanical linkage joining the braking mechanism to the foot brake pedal, with said electrical switching means including a movable actuator, said linear motor incorporating an actuator, the direction of movement and proportionate amount of travel of which is responsive to the direction of travel and proportionate amount of travel of the actuator of the said electrical switching means to which the linear motor is electrically connected, in which the actuator of the linear motor is linked to the mechanical linkage of the braking system in only one direction of travel so that the foot pedal of the braking system may apply braking force to the braking mechanism of greater magnitude than that determined by the position of the actuator of the linear motor, and in which the actuator of the electrical switching means is mounted on the steering wheel.

* * * * *